Nov. 2, 1937.  F. A. EPPS  2,097,835
FUEL OIL DELIVERY CONTROL INDICATOR
Filed March 11, 1936  2 Sheets-Sheet 1
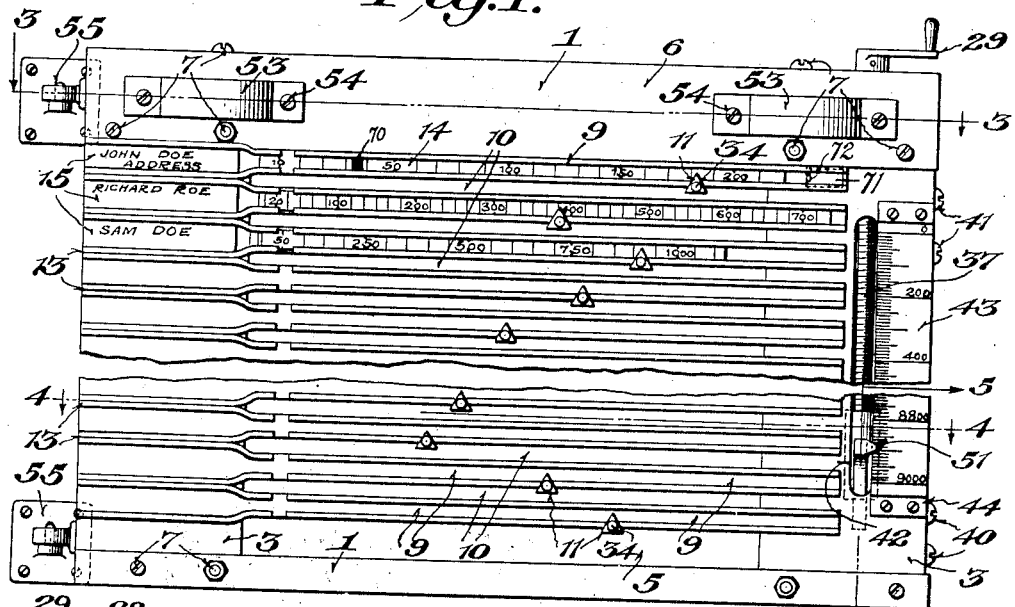
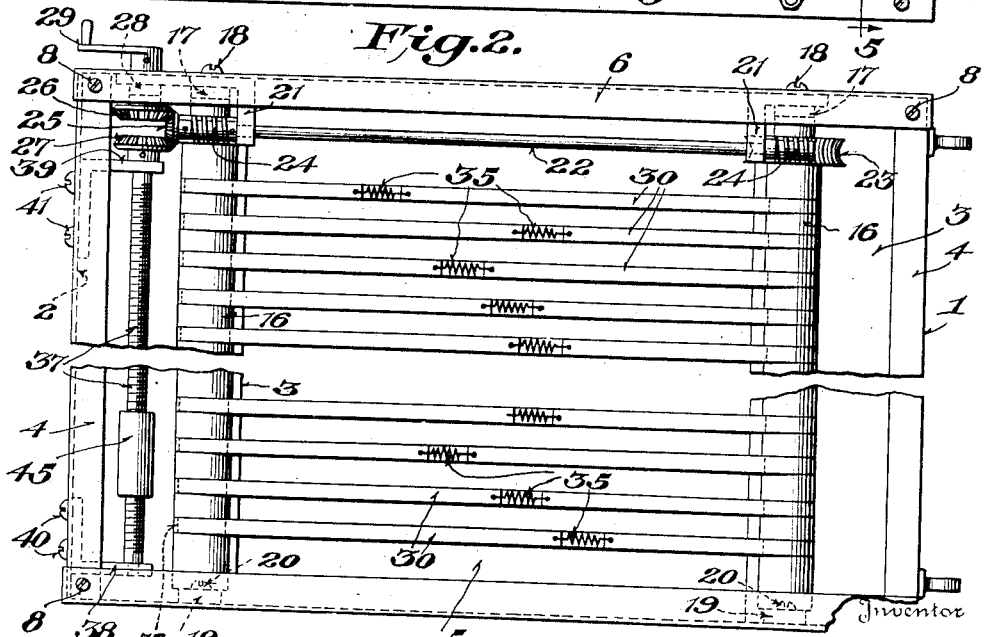
F. A. Epps, Nov. 2, 1937.　　　　　F. A. EPPS　　　　　2,097,835
FUEL OIL DELIVERY CONTROL INDICATOR
Filed March 11, 1936　　　2 Sheets-Sheet 2
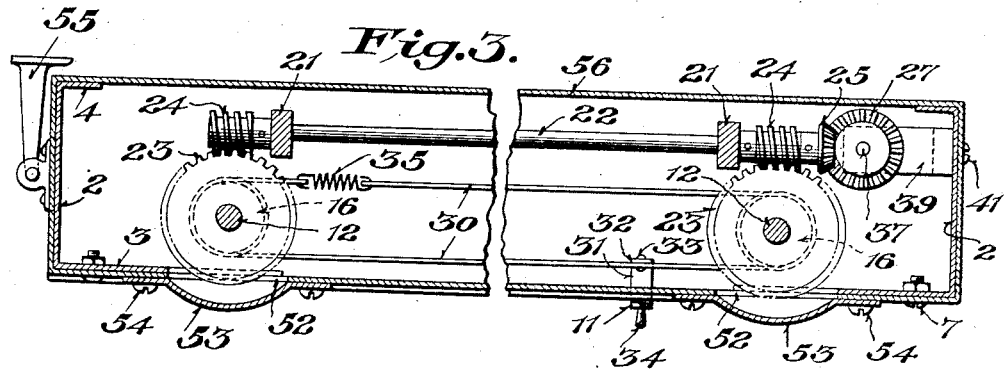
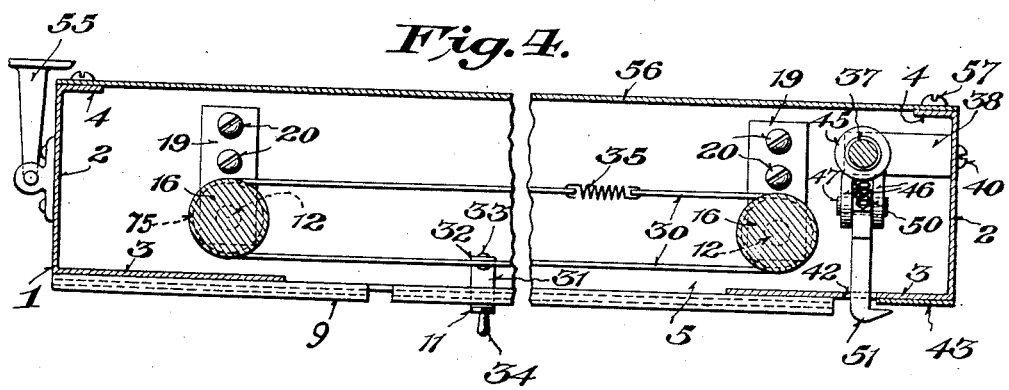
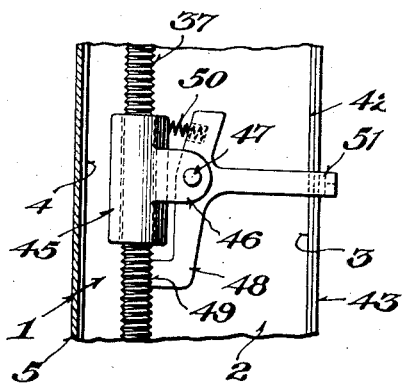
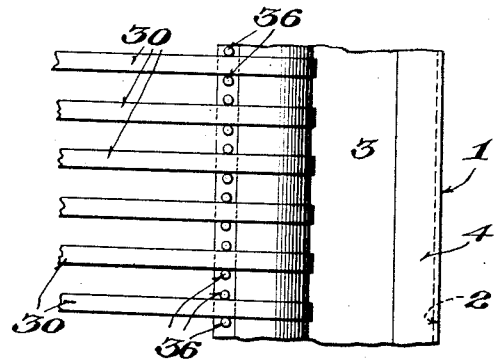
Inventor
F. A. Epps,
By A. M. Houghton
his Attorney Patented Nov. 2, 1937

2,097,835

UNITED STATES PATENT OFFICE 2,097,835

FUEL OIL DELIVERY CONTROL INDICATOR

Frank A. Epps, Westfield, N. J., assignor to Gulf Oil Corporation, a corporation of Pennsylvania Application March 11, 1936, Serial No. 68,351

16 Claims. (Cl. 116—135)

This invention relates to fuel oil delivery control indicators.

Fuel oil is widely used for heating purposes. Each consumer uses oil at a different rate, depending upon the size of building, type of heater, relative degree of heat required, and the weather temperature. The first three factors are more or less constant for a given consumer; but the weather or outside temperature is a variable factor which makes for wide variations in the amount of oil used from day to day in a given installation.

It is desirable that a dealer should know when the oil supply of a given consumer is low, so that he may warn the consumer, and arrange to fill the tank at his own and the consumer's convenience, thereby avoiding rush calls, night fillings and extraordinary demands during a cold snap.

Consumers often neglect to check their tanks and to order more oil when their supply gets low. It has been customary for dealers to gage consumer's oil tanks periodically, or to make tank-truck rounds every week, to insure against any one's tank going empty. These expedients are costly and troublesome for both dealer and consumer.

One object of the invention is to provide means for estimating and indicating the fuel oil reserves of a set of consumers, taking into account individual requirements, and fluctuations in weather temperatures.

Another object is to provide apparatus for estimating and indicating, from day to day, the reserve supply of oil of a set of consumer's tanks, basing the indication upon the difference, from day to day, of mean weather temperature over 24 hours, from standard artificial heating temperature (e. g. 70° F.).

These objects are achieved by the provision of apparatus to be described in detail. The invention embodies the principle of correlating expected fuel consumption, with the difference in mean outside weather temperature, and the usual or standard temperature to which dwellings are artificially heated. Consumers in a given locality ordinarily run their furnaces so as to keep the dwelling heated to a temperature of around 65° F., and for the sake of illustration this will be taken as the typical, actual artificial heating temperature. For reasons set forth post, it is ordinarily better to choose as a working reference a temperature slightly higher than this, viz. 70°. It has been found that the dissipation of heat through the walls, and consequently the heat requirement and oil consumption, of a heated building varies approximately directly as the difference in temperature between standard temperature (70°) and the outside (weather) temperature. Thus, if the outside temperature is 55° one-half as much heating is required as when the outside temperature is 40°. It can safely be assumed that no oil will be consumed for heating when the outside temperature is above 65°; subject to a minor correction described post.

A difference of 1° F. between standard indoor temperature and the mean outdoor temperature for twenty-four hours is called a degree-day. Thus if the mean weather temperature for 24 hours in a given locality is 64°, this is expressed as 6 degree-days. For temperatures below 30° each drop of 1° in outside temperature is considered a 1.5° difference. Cumulative degree-day difference over a given period of time is obtained by adding the degree-day differences for each day.

By gaging a consumer's tank at the beginning and end of, say, a week, and determining the cumulative degree-days for the week, there can be found the fuel consumption under a given set of conditions. For example, if a tank falls 50 gallons during any period of time over which the cumulative degree-days equals 400, then the fuel consumption of 50/400 or 0.125 gallons per degree-day. With this constant known, it can be confidently predicted, for example, that over a day during which the mean weather temperature is 30°, this consumer will use about (70–30) ×0.125 or 5.0 gallons.

I provide apparatus in which these computations are carried out automatically and simultaneously for a large number of consumers. The apparatus comprises a set of strip charts, one for each customer, calibrated in gallons, the calibrations being spaced in accordance with the pre-estimated rate of fuel consumption for the particular customer. A scale of cumulative degree-days is provided, and screw means for advancing a pointer over the scale. Means are provided and so arranged that upon manually advancing the pointer over the degree-day scale, by an amount corresponding to the previous degree-day, other pointers are simultaneously moved over all the strip charts, whereby the probable consumption of oil by each customer during the preceding day, or rather the fuel reserve remaining after such consumption, is automatically indicated on the strip-charts.

One example of a specific embodiment of the apparatus is shown in the accompanying drawings. In the drawings;

Fig. 1 is a front view of the apparatus, as viewed by the user;

Fig. 2 is a rear view of the apparatus with back cover removed;

Fig. 3 is a section taken along line 3—3 of Fig. 1;

Fig. 4 is a section taken along line 4—4 of Fig. 1;

Fig. 5 is a fragmentary sectional view taken along line 5—5 of Fig. 1, to show the degree-day pointer, and Fig. 6 is a fragmentary view of a portion of the rear of the apparatus, to show the belt-alining means.

Referring to the drawings, reference numeral 1 indicates generally a frame composed of end walls 2, front flanges 3 and rear flanges 4, the front of the frame being open as at 5 between the ends of the flanges 3, this opening extending from a point near the top to a point near the bottom of the frame. A cover 6 is bolted by means of bolts 7 to the front top of the frame and extends over the top, down the back and is held in position on the back by bolts 8.

The opening 5 is bridged at close intervals by a plurality of strip-chart retaining devices 9 welded or otherwise secured to the outer faces of the flanges 3. These strip-chart retaining devices are in the form of channels and consist of flat pieces of metal with their sides turned over as shown to form guides for strip-charts to be inserted. The arrangement of these strip-chart retaining means is such as to leave a plurality of open slots 10 across the face of the frame in which travel pointers 11, to be described. At the extreme left each strip-chart retaining device is widened somewhat for the reception of a wider portion of the chart than that accommodated by the portion of the chart retaining device bridging the frame. The widened ends of the strip-chart retaining devices are shown at 13. In each chart retaining device is located a stripchart 14, to be described in detail, and in the widened ends 13 are located cards 15 containing the names and addresses of customers or other data. If desired, the narrow portion of the chart and the wider portion containing the name and address may be made of one piece of material such as cardboard, paper, celluloid or the like, or these parts may be made separately.

The construction of the frame affords a housing in which is located operating mechanism for the pointers 11. Two parallel spindles or shafts 16 are journaled in this housing, each behind the flanges 3, and extend substantially the length of the face opening of the frame, bearings 17 being provided on the underside of the top and held in position by screws 18 and bearings 19 being provided at the bottom and held in position by means of screws 20. The bearings receive axle portions 12 of the shafts. The upper bearings carry brackets 21 forming journals for a shaft 22 (to be described).

Vertical shaft 16 has keyed to it at the top an undercut gear 23 driven by means of worms 24 on the horizontal shaft 22. Shaft 22 is provided at its lefthand end (Fig. 2) with beveled pinion 25 meshing with beveled gears 26 and 27, respectively. Gear 26 is driven by shaft 28 extending through the top of the frame and to which is keyed the operating handle 29. Operation of handle 29 turns beveled gear 26, which in turn rotates pinion 25 to rotate shaft 22 and to drive the gears 23 through the worms 24. This train of gears operates to rotate the two vertical shafts 16 in unison and in the same direction.

There are provided a number of bands 30 corresponding to the slots (10) which extend across the opening of the frame due to the location of the strip-chart retaining means which, as stated, are spaced somewhat apart. Each band carries a pointer 11 having a shank 31 with an upright flange 32 riveted to the band by rivet 33 and each pointer is provided with a small handle 34. This construction permits travel of the shank of the pointer along the slots with the pointer extending on the outside face of the frame and traveling in juxtaposition to the strip-chart, in the strip-chart retaining means. The pointers are preferably bent slightly upward in order that they may travel over the faces of the strip-charts. The bands 30 may be of any suitable material. I have found steel bands to be particularly useful. Their extremities may be connected by means of springs 35 and the adjustment is such that through manipulation of the handle of the pointers the bands may be moved independently of the rotation of the shafts for adjustment purposes. The friction of the bands on the roller portions (16) of the shafts, however, should be such that the bands are rotated upon revolution of the shafts.

The shanks 31 of the pointers serve to hold the bands in horizontal position and in proper alignment with respect to each other, but to avoid slipping which might possibly occur I provide pins 36 on the underside of flanges 3 spaced apart a distance slightly greater than the width of the bands (as shown in detail in Fig. 6); or the shafts 16 may be grooved for reception of the bands as shown at 75 in Figs. 2 and 4.

The construction described permits operation of the pointers along the slots and in front of the strip guides as described.

In combination with the operating mechanism for rotating the vertical shafts 16 and operated through the same handle 29 is a screw worm 37 rotatably mounted in a lower bearing 38 and an upper journal 39 secured to the right-hand side of the frame by means of screws 40 and 41, respectively. The top of the worm 37 has keyed to it a beveled gear 27 driven by beveled pinion 25 keyed to the extreme end of shaft 22.

The right hand flange 3 of the frame is provided with a slot 42 extending the substantial length thereof and adjacent the slot there is provided scale 43 showing degree-days, such scale being held in position by means of clamps 44. The screw worm 37 receives an unthreaded sleeve 45 (Figs. 2, 4 and 5) which is formed with integral spaced lugs 46 receiving a pivot pin 47 upon which a dog 48 is mounted. One arm of this dog is threaded as at 49 to engage the screw threads of the screw worm 37 and this threaded end of the dog is pressed into engagement with the screw worm by means of spring 50. The dog is provided with a pointer extension 51 which projects through the slot 42 and the pointer is bent to travel over the face of the accumulative temperature scale 43. The dog is arranged to engage the feed screw or worm screw 37 by spring pressure in order that it may be returned to zero setting when required by simply lifting the pointer end projecting through slot 42. This compresses the spring 50, disengages the dog from the threads of the feed screw, and permits positioning of sleeve 45 at the desired point along the length of the screw.

For compact construction the top of the frame may be slotted as at 52 to accommodate the gears 23 and these slots are covered by arcuate caps 53 held in position on the top by means of screws 54.

The indicator is provided with hinged brackets 55 for attachment to a wall in order that it may be swung into convenient position for operation and is provided with a back 56 attached to the flanges 4 by screws 57.

The apparatus is put into use in the following manner. The degree-day pointer is pushed up to zero and the gallonage pointers are all moved to the extreme right. For each customer there is provided a blank strip of paper, which is put in guides 9 in the position to be subsequently occupied by the strip-charts. Then for a suitable length of time, record is made daily of cumulative degree-day differences. Each day the degree-day pointer 51 is advanced downward on the degree-day scale (43), by the operation of crank 29, through a distance in degree-days as shown on the scale equal to the number of degree-days that accumulated in the said record for the preceding 24 hour period. Thus the pointer shows the total degree-days on said scale, which is the accumulation of all daily totals from the day of commencement of the record. During this observational period, the first time that a customer's tank is replenished, the gallonage before and after filling is noted. The dealer puts a mark on the paper strip directly opposite the gallonage pointer, and pencils beside the mark the number of gallons in the consumer's tank after delivery was made. In the course of time every consumer will have his tank replenished for the first time during the observation period, and consumers will begin to receive a second replenishment.

When a consumer receives his second filling during the observational period, his tank is gaged before and after filling, and the dealer pencils on the consumer's paper strip a mark directly opposite the gallonage pointer, and notes on the strip the number of gallons in the tank before delivery was made. Then this gallonage is subtracted from the gallonage after the previous filling, to find the gallonage consumed. There is furnished with the apparatus a large number of assorted strip-charts with different spacings (as shown in Fig. 1). The dealer selects for the consumer a strip-chart in which the gallonage spacings correspond to the gallonage between the pencil marks. For example, if a consumer's consumption during the observation period is 200 gallons, and the spacing between pencil marks is three inches, the dealer puts in a strip-chart on which 200 gallons corresponds to about a 3-inch spacing.

When charts have been provided for all consumers, the apparatus is ready to be put into routine operation. In use, each morning the dealer turns the handle (29) to move pointer 51 over scale 43 by an amount equal to the degree-day value for the previous day. (The mean outside temperature for computing this value can be obtained from Government weather reports or from the dealer's own observations.) Upon so turning the handle, all the pointers 11 are simultaneously moved over their strip-charts. Each chart is provided with an index mark for the low danger level. One such mark is shown at 70 in the uppermost chart in Fig. 1. When a pointer approaches the danger mark the customer is notified that he will shortly need oil and thereafter, with the customer's approval, a delivery is effected at or about the time the pointer reaches the danger mark. When a tank is refilled the pointer is set back to the new gallonage.

Sometimes the gallonage scale supplied for a customer does not register the full capacity of his tank. For such cases there are provided frosted-surfaced metal sliders for channels 9, one of which is shown in Fig. 1, and consists of a little plate 71 with a handle portion 72. For example, referring to the uppermost chart in Fig. 1, if the consumer's tank capacity is 500 gallons, the chart does not show full capacity. Supposing the tank to be refilled to 420 gallons, the pointer (11) is set at 200 gallons. The slider is moved over to cover danger mark 70, and the figure "220" is penciled thereon. When the pointer passes the (covered) danger mark and reaches zero, the slider is removed, and the pointer reset to 220.

The apparatus has been found highly successful in fuel oil dealing. The estimations of reserve can be relied upon to an accuracy within a few per cent.

As regards the standard reference heating temperature used in determining the degree-day values, it can be assumed that furnaces, in general, are not called upon to give heat until the outside temperature falls below 65°. Furthermore, fuel consumption is approximately directly (linearly) proportional to the difference between indoor temperature and outdoor temperature. However, fuel consumption predictions based on these assumptions are often not quite accurate. It has been found that the rate of fuel consumption is greater in mild weather and in extremely cold weather than the rate computed on the assumption of direct relation between fuel consumption and temperature difference. This is because in mild weather, there is a time lag in heating the water in a boiler after it has cooled down and before heat is generated in the radiators; while in very cold or stormy weather, the high winds that often accompany such weather cause greater heat losses than usual.

Accordingly, it is advantageous to select 70° rather than 65° as the reference temperature, whereby to show more degree-days in mild weather and thus compensate for abnormally high fuel consumption; and to count each degree difference in temperature, when weather temperature is below 30°, as 1.5 degree-days.

The calculations can be refined in various ways and made to correspond to actual conditions more closely, as for example by considering 1° difference in temperature equal to 1 degree-day when the outside temperature is 70–50°, equal to 1.25 degree-day when the outside temperature is 50–30°, etc.

The present invention is not confined to any special system of computing degree-days. It is useful whatever the standard reference temperature and whatever the temperature-difference—degree-day relationship employed. The term degree-day as used herein refers to simple degree-days and to corrected degree-days. Furthermore, it is not necessary that the temperature difference be taken over a period of exactly 24 hours. Other intervals of time may be used, e. g. 12 hours, and the degree-day pointer moved at 12-hour or other intervals. The term degree-day is used to include such optional schemes.

The gear ratios and pitch of screw 37 are selected to secure a convenient size and capacity of the apparatus. Mechanically equivalent means can be used in lieu of the screws, gears and belts shown.

What I claim is:—

1. An indicator for indicating relationship between two variable quantities, comprising means adapted to be moved definite increments in accordance with one variable quantity and so constructed and arranged as to register said quantity, means having a plurality of scales marked in units of another variable quantity, and a plurality of index means in positive movement-transmitting connection with said first named means, said index means being movable with respect to the scales and being so constructed and arranged that each of said index means moves by an increment equal to that of the others, so that upon setting the first-named means to a certain quantity the plurality of index means is caused to move simultaneously to show the second variable quantity upon said scales.

2. An indicator for fuel delivery control, comprising means adapted to be advanced definite increments in accordance with cumulative degree-days and so constructed and arranged as to register cumulative degree-days, a plurality of separate and independently replaceable charts showing gallonage, means for fixedly supporting said charts, a plurality of means so constructed and arranged as to be advanced with respect to said charts and to indicate gallonage thereon, and means for simultaneously advancing said degree-day registering means and said gallonage indicating means, so that upon setting the degree-day registering means to a cumulative degree-day value, the plurality of gallonage indicating means is caused to move simultaneously to show gallonage.

3. An indicator for fuel delivery control, comprising a scale showing degree-days, an index member for the scale, means for retaining a plurality of charts showing consumer's gallonage, an index member for each of said charts, and means for simultaneously advancing the degree-day scale index member over the degree-day scale and the chart index members over the charts.

4. An indicator for fuel delivery control, comprising a scale showing degree-days, an index member for the scale, means for retaining a plurality of charts showing consumer's gallonage, an index member for each of said charts, means for advancing the degree-day scale index member over the scale, and means in mechanical power transmitting connection with said means, for advancing the chart index members over the charts.

5. An indicator for fuel delivery control comprising a scale showing degree-days, an index member for the scale, means for retaining a plurality of charts showing consumer's gallonage, an index member for each of said charts, means adapted, upon being operated, to advance the degree-day scale index member over the scale, means whereby the index member may be manually shifted along the scale independently of the advancing means, and means in mechanical power-transmitting connection with said means for advancing the degree-day scale index member, and adapted to simultaneously advance the chart index members over the charts, the chart index members being arranged for manual shifting with respect to said last-named means independently thereof.

6. An indicator comprising screw means adapted to be moved definite increments in accordance with one variable quantity and so constructed and arranged as to register said quantity, means providing a plurality of scales marked in units of another and different variable quantity, a plurality of means movable with respect to said scales and adapted in cooperation with said scales to indicate thereon said other and different variable quantity, and gear means interconnecting said screw means and said second movable means so arranged that motion of the screw means is communicated to the second movable means.

7. An indicator for fuel delivery control, comprising a plurality of individual charts each marked with a scale of gallonage of an individual consumer, means for supporting said charts, said charts being arranged to be inserted or replaced on the supporting means independently of each other and being of a form adapted for embodiment as printed sheet material, and index means for each chart, the index means for each chart being adjustable with respect to the chart independently of the remaining index means, the gallonage markings for each chart being so spaced that movement of the index means the same distance over each chart shows the gallonage consumed for a given period, and means for simultaneously moving said index means over the charts by equal increments of motion while preserving the relative positions of the several index means.

8. An indicator for fuel delivery control comprising a plurality of individual detachable charts formed of thin sheet material and each marked with a scale of gallonage of an individual consumer, means for detachably supporting said charts, an index means for each chart movable with respect to the chart and so constructed and arranged as to be independently positioned by hand, the gallonage markings for each chart being so spaced that movement of the index means the same distance over each chart shows the gallonage consumed for a given period, and means for simultaneously moving said index means a like distance over each chart while preserving their relative positions.

9. An indicator comprising a frame, a series of strip chart retaining members extending thereacross in spaced relation, a pair of rotatably mounted shafts carried by said frame behind the chart retaining members, a plurality of endless bands passing around said shafts, pointers carried by said bands to overlie the respective chart retaining members, a cumulative scale mounted upon said frame adjacent a slot therein, a pointer extended through such slot, means for positioning said last-named pointer to predetermined positions along its associated scale, said means serving simultaneously to rotate the said shafts and thereby to advance the first said pointers in unison along their respective strip charts.

10. An indicator comprising a frame having longitudinal side elements, channel members extending therebetween for carrying strip charts, each of said members being outwardly swaged adjacent one end to receive an identification card of greater width than the charts carried thereby and further serving to space the channeled members apart when mounted parallel to each other on said frame, spaced shafts rotatably mounted adjacent the longitudinal side element of the frame, endless bands carried by said shafts and extending therebetween, pointers carried by the respective bands to project into the slots between adjacent channeled members and into proximity to the charts carried thereby, means for rotating said shafts in unison to cause said bands and pointers to move at the same rate transversely of the frame, a chart mounted longitudinally of the said frame, a pointer associated therewith and means for advancing said last-named pointer along its chart simultaneously with movement of the first pointers but at a different rate of travel.

11. An indicator comprising a rectangular frame, spaced channel members extending transversely of the frame and affixed at their ends to the sides thereof, spaced shafts rotatably journaled in the frame, gearing for rotating said shafts, a plurality of bands extending around said shafts, springs connecting the opposed ends of each band to maintain it taut, a pointer carried by each band to project through one of the slots defined by the spaced channeled members, and a strip chart received in each channel member for cooperation with one of the aforesaid pointers.

12. An indicator comprising a rectangular frame, spaced channel members extending transversely of the frame and affixed at their ends to the sides thereof, chart means carried on said channel members, spaced shafts rotatably journaled in the frame and extending longitudinally thereof, said shafts each having a series of annular guide grooves, endless bands received in the guide grooves of said shafts and carrying pointers which project through the spaces between adjacent channeled members and into proximity to the respective faces thereof adjacent said chart means, a scale on the frame, a pointer for each chart arranged to be positioned longitudinally of the frame and scale and manually operated means for causing travel of the transversely moving pointers in unison.

13. An indicator comprising a rectangular frame, spaced members extending transversely thereof, a plurality of charts carried on said spaced members and showing the reserve of fuel for heating buildings under observation, the calibration of such charts being spaced according to comparative rates of fuel consumption, a series of pointers movable over the charts, means for simultaneously moving said pointers, a cumulative degree-day scale on the frame, another pointer advanced by said means across the cumulative degree-day scale whereby by moving the last said pointer to a position indicating the cumulative temperature difference between the mean outdoors temperature for a preceding period of time and a standard indoors temperature, the first said pointers will be advanced simultaneously therewith to positions on their respective charts indicating the amount of fuel then remaining in reserve for heating the respective buildings.

14. An indicator for customer's fuel oil requirements comprising a frame, a plurality of spaced retaining members having charts which are calibrated according to the comparative rates of fuel consumption for heating the customer's buildings, pointers extending through spaces between adjacent chart retaining members and overlying the respective charts, endless bands carrying the individual pointers, spaced rotatable shafts around which said endless bands are passed, gearing for driving said shafts, a scale calibrated to show cumulative degree-days, a pointer movable along said scale in fixed ratio to the first said pointers, whereby by setting the last pointer to the indication on its underlying scale showing the temperature difference between 70° and the mean outdoors temperature over one day, the first said pointers will be moved simultaneously over their respective charts to positions which indicate the reserve of fuel oil in each customer's tank.

15. An indicator for fuel delivery control, comprising movable means so constructed and arranged as to register degree-days, means providing a plurality of chart scales showing customer's gallonage, an index member for each of said chart scales, and means for simultaneously moving the degree-day registering means, and moving the chart index members over the chart scales.

16. An indicator for use in showing consumption of fuel and the like and adapted to show the effect of change of one variable quantity upon a plurality of other variable quantities, comprising a plurality of separate and independently replaceable charts having different scales representing the other variable quantities, means for supporting said charts and index means movable with respect to the charts, the index means being so constructed and arranged as to be moved independently of each other and the scales being so spaced that movement of the index means a given equal distance over the scales, shows on all the charts the effect of the change in the first-named variable quantity upon said second quantities, the chart supporting means being so constructed and arranged that each individual chart can be removed and replaced by another while keeping the index means in position, and means for moving the index means over the charts by equal increments of movement while preserving the relative positions of the several index means.

FRANK A. EPPS.